Figure 1:
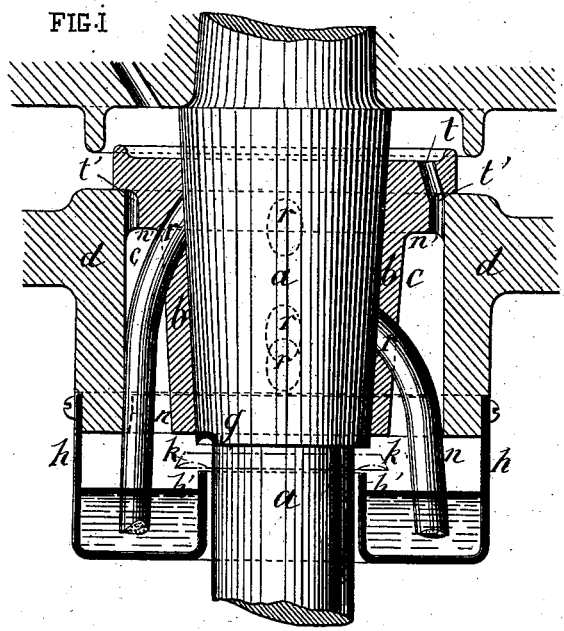

(No Model.) 2 Sheets—Sheet 1.

T. NEL.
LUBRICATOR.

No. 297,622. Patented Apr. 29, 1884.

Witnesses
John M. Speer.
Gustav Schneppe.

Inventor:
Thomas Nel
by his attorneys
Briesen & Steele (No Model.) 2 Sheets—Sheet 2.

T. NEL.
LUBRICATOR.

No. 297,622. Patented Apr. 29, 1884.

Witnesses:
John M. Speer
Gustav Schneppe

Inventor:
Thomas Nel
by his attorneys
Briesen & Steele

UNITED STATES PATENT OFFICE.

THOMAS NEL, OF PARIS, FRANCE.

LUBRICATOR.

SPECIFICATION forming part of Letters Patent No. 297,622, dated April 29, 1884.

Application filed February 26, 1884. (No model.)

*To all whom it may concern:*

Be it known that I, THOMAS NEL, of the city of Paris, France, have invented new and useful Improvements in Lubricators, of which the following is a full, clear, and exact description.

This invention relates to various improvements which I have made in the system of lubricating by capillary attraction and vacuum, based on the employment of Malacca cane or Indian rattan, or of any other vegetable sufficiently porous to serve properly as an intermediate conducting agent between the reservoir of oil and the shaft to be lubricated. This intermediary agent ought to be capillary in order to permit of the spontaneous ascension of the oil from the reservoir to the shaft. It ought to be cellular, and with pores large enough to prevent them filling up and to allow the active circulation of the oil under the sucking action resulting from the rotation of the shaft in hermetic contact with the higher extremity of the said agent. Certain kinds of tropical climbers and reeds possess this quality; but Malacca cane or rattan best fulfills the aforementioned conditions, and is therefore employed by preference. This invention does not, therefore, involve any change in principle, but relates only to various mechanical arrangements of bearings, plumber-blocks, and sockets for lubricating automatically vertical shafts and loose pulleys. These arrangements have for object both to assure the automatic lubrication of special parts in difficult cases, and to improve the manufacture of the apparatus and to render it more economical.

I will proceed to describe *seriatim* six examples of plumber-blocks and pulleys, represented in the drawings annexed.

Figure 4:
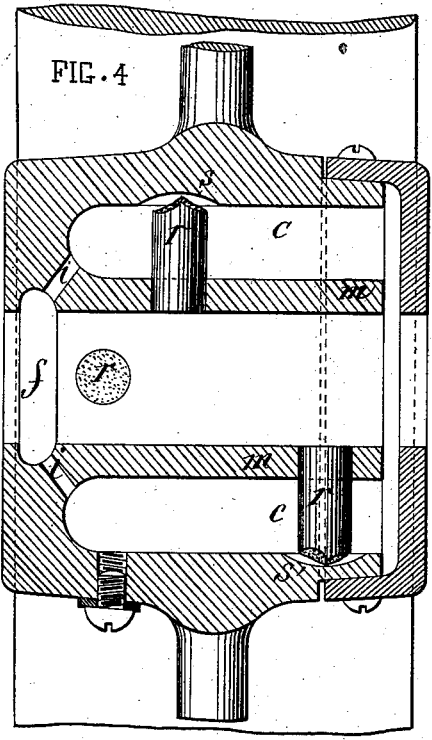
Figure 2:
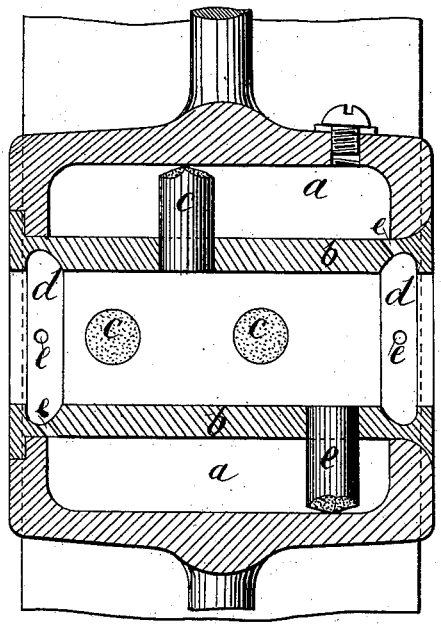
Figure 3:
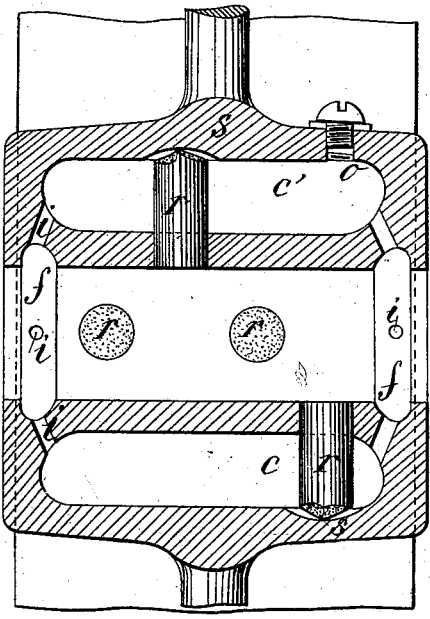
Figure 6:
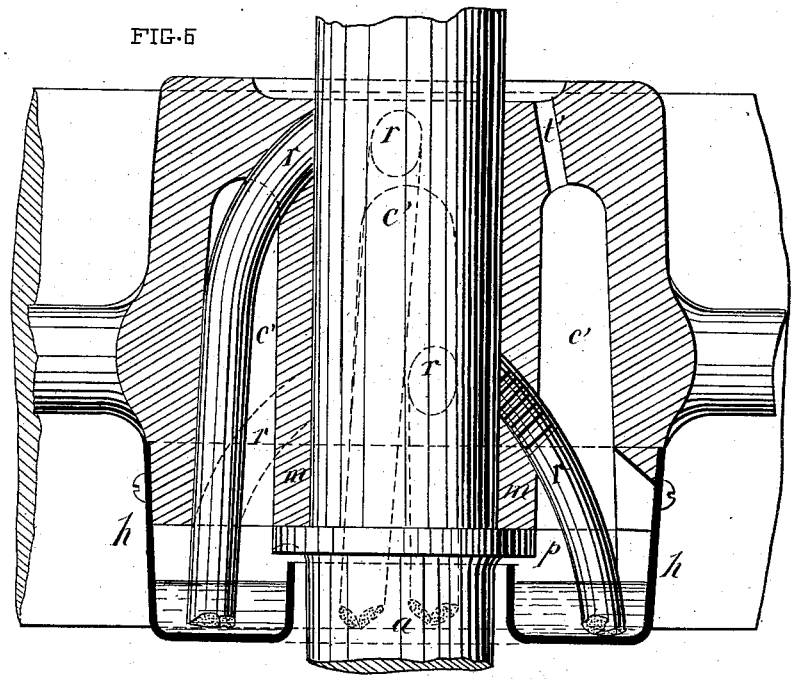
Figure 5:
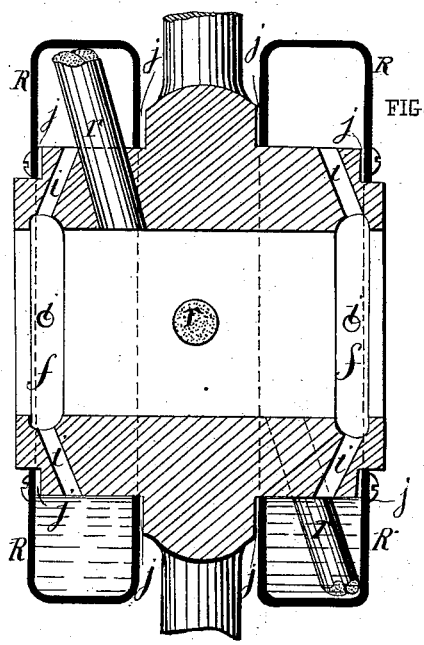
Figure 7:

Figure 1 is a vertical section of a bolster-bearing of a vertical shaft for a lapidary's wheel, or for a hydro-extractor, for example. Fig. 2 represents an axial section of the boss of a loose pulley furnished with a brass bush. Fig. 3 represents an axial section of the boss of a loose pulley, in which the reservoir for oil is arranged in the casting itself, thus leaving out the brass bush. Fig. 4 shows a similar boss, but in which the annular reservoir extends to the face of the boss and is closed by a cover-plate. Fig. 5 represents an arrangement of reservoir which can be fixed to the circular boss of an existing pulley. Fig. 6 is a section of a loose pulley on a vertical axis. Fig. 7 represents a particular method of fixing the canes in the bearing of a plumber-block or pulley.

Referring first to the example shown in Fig. 1, a conical journal-bearing for the spindle of a lapidary's wheel is represented; but the same arrangement is equally applicable to a cylindrical shaft and for whatever purpose it may be used. This very simple arrangement is constructed as follows: In the hollow of the frame-work I form a circular chamber, C, limited at top and bottom by the ribs $n$ $n$, in which is fitted the bush $b$, of brass or any other metal, in which the shaft $a$ turns. On the lower turned end of the socket $d$ is fixed an oil-reservoir, $h$, made of brass or sheet-iron, and having an internal upwardly-turned flange, which surrounds the shaft without touching it. This oil-reservoir is fixed on the socket $d$ by any suitable means. The journal on the shaft projects over the inner flange of the reservoir, so that the oil dropping from the shaft falls back into the reservoir. In order effectually to prevent this oil from running down the shaft, the journal might have a drip-groove, $g$, at bottom, forming a sharp edge, from which the oil must fall into the reservoir. The same object could be attained by fitting the shaft, whether smooth or not, with a conical collar, K, (shown in dotted lines,) or by a suitable hoop, which can be fixed on the shaft. The upper part of the bush $h$ can be cut in the form of a trough, in order the more easily to fill the lower reservoir. The oil can reach the latter either by running down the shaft while lubricating it, or by the holes $t$, formed opposite the channeling $t'$, cut in the circular rib $n'$.

In order to prevent the dust getting into the reservoirs, there may be formed on the under side of the lapidary's wheel a projecting ring entirely covering the bush $b$. In this wheel a hole could be made communicating with the trough for filling. The parts being thus arranged, pieces of cane $r$ are let into the bush at various heights and arranged in quincunx order in the drilled surface of the bush. The upper extremity of these canes is exactly flush with the interior of the bush, and is in perfect contact with the shaft. The lower extremity dips to the bottom of the oil-reservoir $h$ after passing the channels arranged in the lower rib, $n$, of the socket $d$. The working of this system is as follows: The oil, even during the stoppage of the machine, rises by capillary attraction to the top end of the cane in contact with the shaft, and there is here formed between that and the cane a hermetical joint, whereby the cane becomes a pneumatic duct as soon as the rotation commences. The shaft carries off mechanically the first drops of oil which have arrived by capillary attraction, and in this manner produces a vacuum in the pores of the canes and primes them. There results from this a suction of the drops of oil proportional to the speed, which gives a perfect lubrication of the shaft. The oil thus drawn up by the shaft runs down again along the latter, and, thrown by the edge $g$ and the centrifugal force, falls into the reservoir, to be drawn up again by the canes. The reservoir of oil may also be cast with the socket $d$ of the frame-work as well as the bush $b$. A cleaning-out hole closed by a screw-plug is made under the reservoir.

Referring now to the application of the invention to loose pulleys, the pulley shown in Fig. 2 is furnished with a brass bush, $b$, between which and the hub is formed the oil-chamber $a$. The bush $b$ is burred into its seat therein, and it has holes formed in it in quincunx order, to receive the pieces of cane $c$ flush at their inner ends with the bearing-surface, their outer ends being beveled, and butt against the outer circumference of the chamber, to prevent their withdrawal from the shaft. $d$ are channels, and $e$ holes in the bush for the return of the excess oil. The pulley is by this means effectually lubricated at all speeds, the capillary attraction alone sufficing for low speeds, and the pneumatic action or suction coming in aid thereof at high speeds. This mode of lubrication is excellent, but costly, on account of the brass bush and the work of fitting it in position, and to reduce the cost various modifications shown in Figs. 3, 4, and 5 may be adopted.

Fig. 3 represents a pulley in which the oil-chamber, (indicated here by the letter C,) as well as the holes for the canes, is cast in the boss.

In the pulleys with brass bushes, already described, the oil spreads itself out at certain speeds in a circular film of a few millimeters in thickness, and the canes cut at an angle can only dip a few of their pores into this thin layer.

In order to assure in the pulleys made in cast-iron a greater depth of immersion for the canes, cavities or cells $s$ are cored out opposite the holes for the passage of the canes $r$ in the external wall of the reservoir. The liquid accumulated during rotation in these small receptacles presents to the free extremity of the cane a depth of immersion more than double with a small volume of oil. The feed is thus more certain. In this style of pulley the excess of oil returns to the reservoir in the same way as described for the one with a brass bush—that is to say, the boss has at each extremity a collecting-groove, $f$, with several return-holes, $i$. A hole, $o$, for filling and cleaning out, closed by a screwed plug, is bored in the outer wall of the boss. This hole will also serve for the introduction of the canes. Loose pulleys can also be constructed in halves, as next described. The type of pulley represented by Fig. 4 differs from the preceding only in this: The oil-reservoir C, cast in the boss, is open at the side, which facilitates molding in the foundry, the examination of the canes, and the cleaning out. The open side is turned to receive a cover, $j$, tightly fitted on the boss, and fastened by screws. This cover is bored for the shaft; but a certain space is left between it and the bearing part $m$ of the boss to allow the oil to return, in place of the collecting-groove $f$, as on the opposite side. The bearing part $m$ can also project outside the cover a few millimeters, if it is desired to avoid the friction of the cover against the collars or other abutments; but in this case it will be necessary to provide the collecting-groove $f$ for the return of the oil at both ends of the bearing-surface.

For economical reasons, and on account of the friction, the pulleys chambered in the boss cast-iron bushes, previously drilled with hole for the insertion of the canes, may be substituted for brass ones. These bushes would be turned conical, and either driven in fast or secured in the bosses by screws.

The arrangement represented in Fig. 5 is an example of the application of the cane lubricators to existing loose pulleys which it is desired to retain in use. The system consists in turning down the boss on each side of the arms, and as near to them as possible, and fitting to the parts thus prepared the two loose reservoirs R R, made of brass or sheet-iron or tin-plate. A tight joint, $j$, is made between the exterior side of each reservoir R and the shoulder left on the boss, so that no oil may be lost. Similarly, between the interior side of these reservoirs and the first shoulder cut on the face of the boss a washer is placed, to make a tight joint at the point where the reservoir is secured by the screws. Finally, the central part of the boss extends slightly beyond the reservoirs, so that the latter will not rub against the collars or abutments on the shaft. The boss is pierced with holes for the canes $r$, which extend to the outer circumference oil-reservoirs, which are each provided with filling and cleaning holes, and the bearing-surface of the boss is formed with collecting-channels $f$ and return-holes $i$ for the oil.

For the lubrication of loose pulleys and friction-pulleys on a vertical axis, the same arrangement is employed as that shown in Fig.

1, with this sole difference in the working, that in this case it is the reservoir itself which turns, and not the shaft. This style of pulley represented in Fig. 6 can be arranged like Fig. 4 as regards the cast-iron boss. This bearing portion of the boss $m$ rests on a collar, $p$, of the shaft or supporting-axis. This collar ought to be large enough to extend over the inner flange of the lower oil-reservoir, $h$. The circular reservoir C of the preceding arrangements can also be replaced by a certain number of conical cavities, C', cast in it, and allowing the passage of the canes.

The arrangement of the canes of the loose reservoir, and the method of mounting and fixing the latter are similar to that described for the system of lubricating vertical shafts, Fig. 1.

When the pivot is fixed above the pulley, the apparatus is simplified, as the oil-reservoir can be completely closed, instead of having it turned up in the interior around the shaft. In all these bosses, as well as in the bushes of plumber-blocks, the canes can be fixed and prevented from retracting themselves by tapping the holes made for them and screwing them therein, as shown in Fig. 7.

I do not claim, broadly, the employment of cane in lubricators for lubricating by capillary and vacuum action.

I claim—

1. The combination and arrangement of parts constituting the apparatus for lubrication by means of canes for the cylindrical or conical journals of vertical shafts, in connection with an oil-reservoir having an internal flange, whereby to assure the excess of oil returning to the reservoir, substantially as herein shown and described.

2. The chambered and bushed boss for loose pulleys, the same having channels $d$ and apertures $e$, whereby to effect automatic lubrication by means of canes, substantially as herein described, and shown in Fig. 2, or equivalents shown in Figs. 3 and 4 of the drawings.

3. The combination, with the bosses of existing pulleys, of oil-chambers having internal flanges encircling the perforated boss, and of canes fitted therein, substantially as described, and shown in Fig. 5 of the drawings.

4. The combination, with the chambered bosses of loose pulleys and friction-pulleys on vertical axes, of loose reservoirs having internal flanges fitted in the boss, substantially as herein described, and shown in Fig. 6 of the drawings.

5. The combination of the oil-reservoir having internal flange with the bushing $b$, canes $r$, and shaft $a$, said shaft having an enlargement which overhangs the inner flange of the oil-reservoir, substantially as herein shown and described.

The foregoing specification of my invention for improvements in lubricators signed by me this 22d January, 1884.

THOMAS NEL.

Witnesses:
E. P. MacLean,
Albert Moreau.